United States Patent
Lee et al.

(10) Patent No.: US 10,306,318 B2
(45) Date of Patent: May 28, 2019

(54) DISPLAY DEVICE AND METHOD FOR RECOMMENDING CONTENTS OF THE DISPLAY DEVICE

(71) Applicant: SAMSUNG ELECTRONICS CO., LTD., Suwon-si, Gyeonggi-do (KR)

(72) Inventors: Hee-ran Lee, Suwon-si (KR); Seung-min Shin, Seoul (KR); Do-sung Kim, Hwaseong-si (KR); Je-youn Dong, Suwon-si (KR); In-jee Song, Seoul (KR); Yong-deok Kim, Anyang-si (KR); Bong-seok Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/646,391

(22) Filed: Jul. 11, 2017

(65) Prior Publication Data

US 2018/0027295 A1    Jan. 25, 2018

(30) Foreign Application Priority Data

Jul. 22, 2016 (KR) ........................ 10-2016-0093638

(51) Int. Cl.
*H04N 21/45* (2011.01)
*H04N 21/466* (2011.01)
(Continued)

(52) U.S. Cl.
CPC ....... *H04N 21/4668* (2013.01); *H04N 21/422* (2013.01); *H04N 21/4345* (2013.01);
(Continued)

(58) Field of Classification Search
None
See application file for complete search history.

(56) References Cited

U.S. PATENT DOCUMENTS

| | | |
|---|---|---|
| 8,683,525 B2 | 3/2014 | Ellis et al. |
| 9,063,934 B2 | 6/2015 | White |

(Continued)

FOREIGN PATENT DOCUMENTS

| | | |
|---|---|---|
| EP | 1 810 505 | 7/2007 |
| JP | 2008-288751 | 11/2008 |

(Continued)

OTHER PUBLICATIONS

Extended Search Report dated Oct. 19, 2017 in counterpart European Patent Application No. 17181946.9.

(Continued)

*Primary Examiner* — Cai Y Chen
(74) *Attorney, Agent, or Firm* — Nixon & Vanderhye P.C.

(57) ABSTRACT

A display device is disclosed. The display device includes a display, a communication interface comprising circuitry, a storage configured to store combined information on contents available from a plurality of input sources, and a processor configured to control the communication interface to receive an external input signal from the plurality of input sources, display, through the display, recommendation information on a content available through a first input source from among the plurality of input sources based on a viewing history of a user and the combined information stored in the storage, the viewing history of the user is a viewing history related to an external input signal provided through a second input source from among the plurality of input sources.

18 Claims, 16 Drawing Sheets

(51) Int. Cl.
  H04N 21/422    (2011.01)
  H04N 21/434    (2011.01)
  H04N 21/4363   (2011.01)
  H04N 21/44     (2011.01)
  H04N 21/442    (2011.01)
  H04N 21/462    (2011.01)
  H04N 21/482    (2011.01)
  H04N 21/84     (2011.01)
  H04N 21/418    (2011.01)

(52) U.S. Cl.
  CPC ... *H04N 21/4363* (2013.01); *H04N 21/44008* (2013.01); *H04N 21/44209* (2013.01); *H04N 21/44222* (2013.01); *H04N 21/4532* (2013.01); *H04N 21/4622* (2013.01); *H04N 21/4667* (2013.01); *H04N 21/482* (2013.01); *H04N 21/84* (2013.01); *H04N 21/4184* (2013.01)

(56) References Cited

U.S. PATENT DOCUMENTS

| | | | |
|---|---|---|---|
| 2003/0020744 A1* | 1/2003 | Ellis | H04H 60/31 715/723 |
| 2007/0157242 A1* | 7/2007 | Cordray | H04H 60/33 725/46 |
| 2010/0125544 A1 | 5/2010 | Lee et al. | |
| 2012/0017244 A1 | 1/2012 | Ellis et al. | |
| 2012/0078997 A1 | 3/2012 | Evans et al. | |
| 2012/0233640 A1 | 9/2012 | Odryna et al. | |
| 2013/0091524 A1* | 4/2013 | Hong | H04N 21/4332 725/49 |

FOREIGN PATENT DOCUMENTS

| | | |
|---|---|---|
| JP | 2010-288024 | 12/2010 |
| KR | 10-0824600 | 4/2008 |
| KR | 10-2010-0001051 | 1/2010 |
| KR | 10-2010-0055712 | 5/2010 |
| KR | 10-2010-0096975 | 9/2010 |
| KR | 10-2015-0055410 | 5/2015 |
| KR | 10-2015-0111760 | 10/2015 |
| WO | 2006/048820 | 5/2006 |
| WO | WO 2015/147421 | 10/2015 |

OTHER PUBLICATIONS

Search Report and Written Opinion dated Oct. 25, 2017 in counterpart International Patent Application No. PCT/KR2017/007603.
European Search Report dated Jun. 12, 2018 for EP Application No. 17 181 946.9.

* cited by examiner

| CHANNEL NUMBER | BROADCASTING STATION UNIQUE NUMBER | NAME OF BROADCASTING STATION | NAME OF PROGRAM | GENRE | INPUT SOURCE | SERVICE PROVIDER |
|---|---|---|---|---|---|---|
| 5 | 6 | SBS | GOOD MORNING | ENTERTAINMENT | Settop | KT |
| 7 | 7 | KBS2 | TV NOVEL FLOWER SMELL OF MY MIND | DRAMA | Settop | KT |
| 9 | 9 | KBS1 | MORNING GROUND | CULTURE/INFORMATION | Settop | KT |
| 11 | 11 | MBC | TODAY'S MORNING LIVE | CULTURE/INFORMATION | Settop | KT |
| 13 | 13 | EBS | GO! SUPERWINGS | EDUCATION | Settop | KT |
| ⋮ | | | | | | |
| 5 | 6 | SBS | GOOD MORNING | ENTERTAINMENT | CABLE | LOCAL CABLE |
| 7 | 7 | KBS2 | TV NOVEL FLOWER SMELL OF MY MIND | DRAMA | CABLE | LOCAL CABLE |
| 9 | 9 | KBS1 | MORNING GROUND | CULTURE/INFORMATION | CABLE | LOCAL CABLE |
| 12 | 11 | MBC | TODAY'S MORNING LIVE | CULTURE/INFORMATION | CABLE | LOCAL CABLE |
| 15 | 13 | EBS | GO! SUPERWINGS | EDUCATION | CABLE | LOCAL CABLE |

| CHANNEL NUMBER | BROADCASTING STATION UNIQUE NUMBER | NAME OF BROADCASTING STATION | NAME OF PROGRAM | GENRE | INPUT SOURCE | VIEWING START TIME | VIEWING END TIME |
|---|---|---|---|---|---|---|---|
| 5 | 6 | SBS | MORNING WIDE (PART 3) | CULTURE/INFORMATION | SETTOP | 16.6.28 07:40 | 16.6.28 07:55 |
| 7 | 7 | KBS2 | KBS MORNING NEWS TIME | NEWS | SETTOP | 16.6.28 08:00 | 16.6.28 08:10 |
| 8 | 7 | KBS1 | KBS MORNING NEWS TIME | NEWS | CABLE | 16.6.28 08:11 | 16.6.28 08:40 |
| ... | | | | | | | |

| CHANNEL NUMBER | BROADCASTING STATION UNIQUE NUMBER | NAME OF BROADCASTING STATION | NAME OF PROGRAM | GENRE | INPUT SOURCE | VIEWING START TIME | VIEWING END TIME |
|---|---|---|---|---|---|---|---|
| 7 | 7 | KBS2 | DESCENDANTS OF SUN THE SIXTH EPISODE | DRAMA | SETTOP | 16.3.1 22:00 | 16.3.1 23:00 |
| 8 | 7 | KBS2 | DESCENDANTS OF SUN THE SEVENTH EPISODE | DRAMA | CABLE | 16.3.8 22:00 | 16.3.8 23:10 |
| : | : | : | : | : | : | : | : |
| NULL | NULL | KBS2 | DESCENDANTS OF SUN THE EIGHTH EPISODE | DRAMA | USB | 16.3.27 11:10 | 16.3.27 12:23 |
| : | : | : | : | : | : | : | : |

610  620  630  640  650  660  670  680

DISPLAY DEVICE AND METHOD FOR RECOMMENDING CONTENTS OF THE DISPLAY DEVICE

CROSS-REFERENCE TO RELATED APPLICATION

This application is based on and claims priority under 35 U.S.C. § 119 to Korean Patent Application No. 10-2016-0093638, filed in the Korean Intellectual Property Office on Jul. 22, 2016, the disclosure of which is incorporated by reference herein in its entirety.

BACKGROUND

1. Field

The present disclosure relates generally to a display device and a control method thereof, for example, to a display device which provides an image through a plurality of input sources and a control method thereof.

2. Description of Related Art

TV viewers nowadays are not only provided with contents through terrestrial broadcasting but also through a plurality of input sources (a set-top box, cable broadcasting, USB, Internet streaming, etc.).

However, even though contents are provided through a plurality of input sources, users mostly prefer only some of broadcast channels or contents.

In order to address the aforementioned problem, set-top boxes, cable channels, etc. provide a service of recommending a content or a broadcast channel based on a viewing history of user. However, such a recommendation service has a problem that the service cannot recommend an optimal content because such a service does not integrally consider all the plurality of input sources that a user uses.

SUMMARY

An aspect of example embodiments relates to a display device which integrally manages all the information on contents provided through a plurality of input sources and recommends a content based on a viewing history of a user irrespective of an input source (e.g., including viewing history information of all input sources), and a content recommendation method thereof.

According to an example embodiment, a display device is provided, the display device including a display, a communication interface comprising communication circuitry, a storage configured to store combined information on contents available from a plurality of input sources, and a processor configured to control the communication interface to receive an external input signal from the plurality of input sources, display, through the display, recommendation information on a content available through a first input source from among the plurality of input sources based on a viewing history of a user and the combined information stored in the storage, the viewing history of the user is a viewing history related to an external input signal provided through a second input source from among the plurality of input sources.

The processor may provide the recommendation information based on an external input signal currently input through the first input source.

The processor may, in response to occurrence of an event where it is not possible to receive the external input signal from the second input source, provide content recommendation information available through the first input source among the plurality of input sources.

The processor may generate a combined viewing history in which a viewing history with respect to each of the plurality of input sources is combined and provide the content recommendation information based on the combined viewing history.

The processor may provide recommendation information on a content corresponding to an external input signal currently input among the plurality of input sources based on the combined viewing history and the combined information stored in the storage The processor may classify and provide the content recommendation information according to at least one of a viewing time of content, a viewing frequency of content, a viewing lasting time of content and a genre of content based on the combined viewing history.

The processor may generate the combined information based on at least one of information included in a signal provided from the plurality of input sources, information provided from an external server and information included in an image provided through the display, and store the combined information in the storage.

The processor may, in response to occurrence of at least one of an event where the received external input signal is changed, an event where a content provided through the display is changed and an event where a predetermined time arrives, update the combined information stored in the storage.

Meanwhile, according to an example embodiment, a content recommendation method of a display device is provided, the method including combining information on contents available from a plurality of input sources and storing the combined information based on an external input signal received from the plurality of input sources, and providing recommendation information on a content available through a first input source among the plurality of input sources based on a viewing history of a user and the stored combined information, the viewing history of the user is a viewing history related to an external input signal provided through a second input source from among the plurality of input sources.

The providing recommendation information may include providing the recommendation information based on an external input signal currently input through the first input source.

The providing recommendation information may include, in response to occurrence of an event where it is not possible to receive the external input signal from the second input source, providing content recommendation information available through the first input source among the plurality of input sources.

The method may further include generating a combined viewing history in which a viewing history with respect to each of the plurality of input sources is combined, and the providing recommendation information may include providing the content recommendation information based on the combined viewing history.

The providing recommendation information may include providing recommendation information on a content corresponding to an external input signal currently input among the plurality of input sources based on the combined viewing history and the stored combined information.

The providing recommendation information may include classifying and providing the content recommendation information according to at least one of a viewing time of content, a viewing frequency of content, a viewing lasting time of content and a genre of content based on the combined viewing history.

The combining and storing may include generating the combined information based on at least one of information included in a signal provided from the plurality of input sources, information provided from an external server and information included in an image provided through the display and storing the combined information.

The method may further include updating the stored combined information in response to occurrence of at least one of an event where the received external input signal is changed, an event where a content provided through the display is changed and an event where a predetermined time arrives.

According to various example embodiments, user convenience may improve as contents can be recommended to a user integrally considering all the contents provided through a plurality of input sources.

BRIEF DESCRIPTION OF THE DRAWINGS

The above and/or other aspects, features and attendant advantages of the present disclosure will become more apparent and readily appreciated from the following detailed description, taken in conjunction with the accompanying drawings, in which like reference numerals refer to like elements, and wherein:

FIG. 3 is a diagram illustrating an example of combined information generated by combining information on contents available from a plurality of input sources according to an example embodiment.

FIG. 4 is a diagram illustrating an example of a combined viewing history of a user according to an example embodiment;

FIG. 6 is a diagram illustrating another example of a combined viewing history of a user according to an example embodiment;

DETAILED DESCRIPTION

Hereinafter, the terms used in the example embodiments will be briefly described before describing the example embodiments in greater detail.

Figure 1:
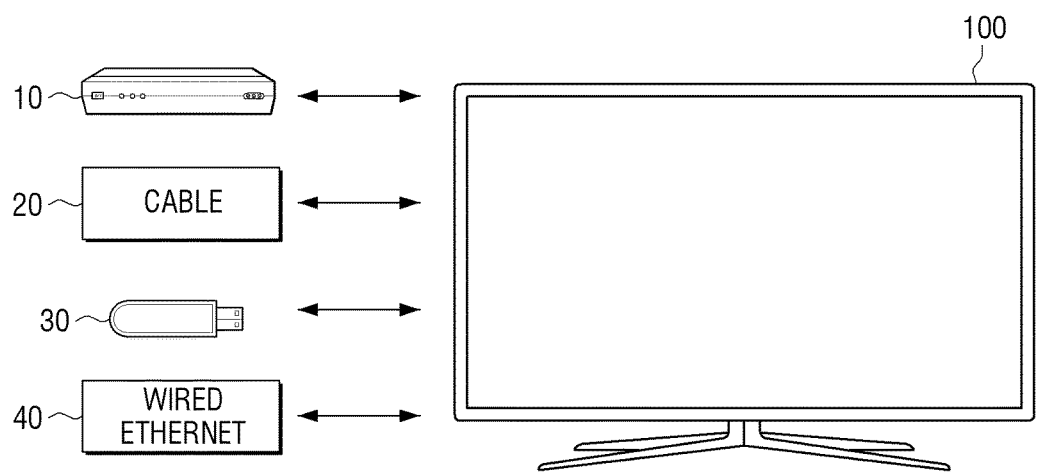
FIG. 1 is a diagram illustrating an example configuration of a display device according to an example embodiment.

FIG. 1 is a diagram illustrating an example configuration of a display device according to an example embodiment.

According to FIG. 1, the display device 100 may receive an external input signal from, for example, and without limitation, a set-top box 10, a cable 20, a USB 30 or the like, but is not limited thereto. The display device 100 may also receive a signal and/or be connected to a network via wired Ethernet 40. The display device 100 may receive an external input signal from various input sources which can provide a content such as Wi-Fi, Bluetooth, a streaming service, an antenna or the like.

The display device 100 may be implemented as a digital TV as illustrated in FIG. 1, but is not limited thereto. The display device 100 may be implemented as various types of devices which can receive a content through a plurality of input sources such as, for example, and without limitation, a PC, a cell phone, a table PC, a PMP, a PDA, a navigation or the like. Hereinafter, for convenience of explanation, the example in which the display device 100 is implemented as a digital TV will be described.

If the display device 100 is implemented as a digital TV, the display device 100 may be controlled by a user motion, a user voice or a remote control device (not illustrated). The remote control device is for remotely controlling the display device 100, and the remote control device may receive a user command and transmit a control signal corresponding the user command to the display device 100. For example, the remote control device may be implemented in various ways such that the remote control device senses its movement and transmits a signal corresponding to the movement, senses a voice and transmits a signal corresponding to the voice, or transmits a signal corresponding to an input key.

The display device 100 may provide a content that is provided by an input source selected according to a user command input through the remote control device among the plurality of input sources, to a screen. The content herein may refer to a broadcast channel, a broadcasting program, a VOD content, a streaming content, and the like, but is not limited thereto. The content may refer to all types of contents provided by an input source.

FIG. 1 illustrates that the plurality of input sources, that is, the set-top box 10, the cable 20, the USB 30, wired Ethernet 40, etc., are connected with the display device 100 simultaneously. However, it is also possible that at least one of the plurality of input sources is connected at different time point and the display device 100 receives an external input signal.

For example, if the display device 100 is implemented such that, after the display device 100 is connected to the set-top box 10 and receives an external input signal, the display device 100 is separated from the set-top box 10 and connected to the USB 30, the display device 100 may classify the contents that a user viewed according to each different input source, that is, classify the contents provided by the set-top box 10 and by the USB 30, and generate a viewing history of a user.

Hereinafter, various example embodiments will be described with reference to various block diagrams illustrating example configurations of the display device 100.

Figure 2A:
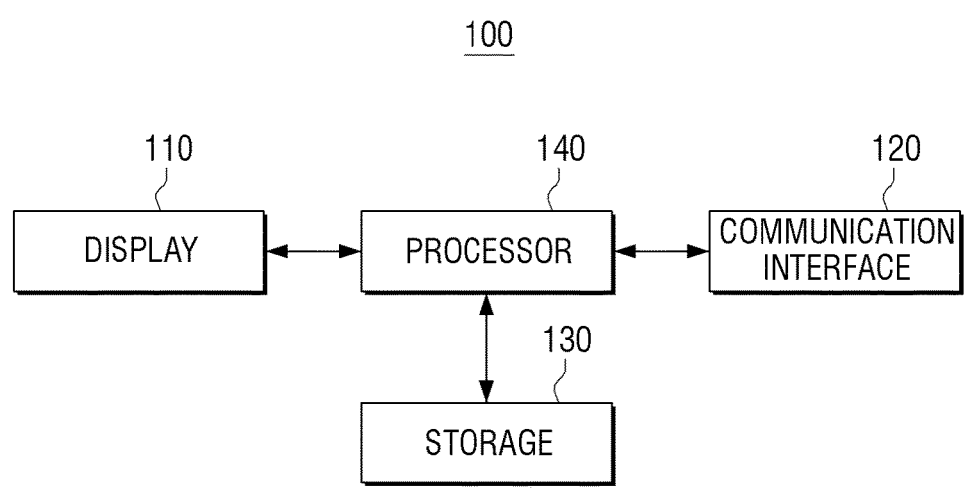
FIGS. 2A to 2B are block diagrams illustrating an example configuration of a display device according to an example embodiment.
Figure 2B:
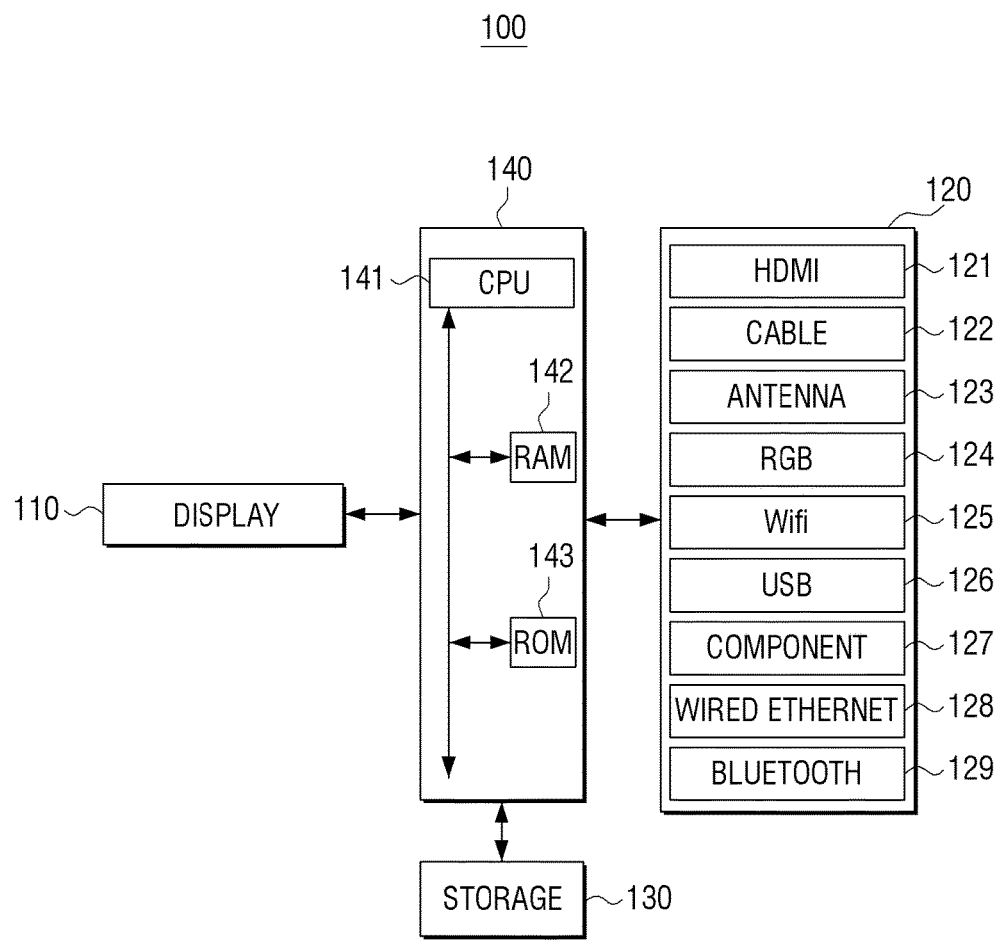

FIGS. 2A and 2B are block diagrams illustrating example configurations of a display device according to an example embodiment.

According to FIG. 2A, the display device 100 may include a display 110, a communication interface (e.g., including communication circuitry) 120, a storage 130 and a processor (e.g., including processing circuitry) 140.

The display 110 may display various screens. The screen herein may include a content screen received from a plurality of input sources, a content recommendation information screen provided by the processor 140 which will be described later, a graphic user interface (GUI) or the like.

The display 110 may be implemented as various forms of displays such as a liquid crystal display, an organic lightemitting diode, a liquid crystal on silicon (LCoS), a digital light processing (DLP) or the like, but is not limited thereto.

The communication interface 120 may include various communication circuitry and receive an external input signal from a plurality of input sources. The communication interface 120 may receive an external input signal from a plurality of input sources by a wired or a wireless method. The wired method may be implemented by HDMI 121, DVI (not illustrated), a component 127, wired Ethernet (128) or the like, and the wireless method may be implemented by Wi-Fi 125, an antenna 123, Bluetooth 129 or the like, but is not limited thereto.

For example, the communication interface 120 may include various circuitry, such as, for example, and without limitation, an input terminal according to HDMI standard, be connected to the set-top box 10 and receive an external input signal. The communication interface 120 may also be implemented as a Wi-Fi 125 communication module and receive an external input signal from various streaming services and be provided with a content.

The storage 130 may store various data such as an operating system (O/S) software module for operating the display device 100, a variety of applications, various contents that a user views and the like.

For example, the storage 130 may store a viewing history of a user with respect to an external input signal received in the communication interface 120. For example, if the display device 100 is connected to the USB 126, the communication interface 120 may receive an external input signal from the USB 126, and the viewing history of the content viewed through the USB 126 may be stored in the storage 130.

Further, the storage 130 may combine (or integrate) information on the contents provided by a plurality of input sources and store the combined information (or integrated information). For example, if the display device 100 is connected to the set-top box 10 and the cable 20, the storage 130 may combine information on the contents available from the set-top box 10 and the cable 20, and store the combine information.

The processor 140 may include various processing circuitry and control overall operations of the display device 100. The processor 140 may include various processing circuitry, such as, for example, and without limitation, one or more than one of a dedicated processor, a central processing unit (CPU), a controller, an application processor (AP), a communication processor (CP) or an ARM processor.

The processor 140 may display, through the display 110, recommendation information on a content available through a second input source among the plurality of input sources based on the viewing history of a user with respect to an external input signal provided through a first input source among the plurality of input sources and the combined information stored in the storage 130.

The processor 140 may provide, through the display 110, recommendation information on a content based on the combined viewing history of a user stored in the storage 130 and the combined information. Further, the processor 140 may provide recommendation information on a content based on the combined viewing history of a user to the display, separately from the combined information. For example, while the set-top box 10 and the cable 20 are connected with the display device 100, if the information on a content that the set-top box 10 and the cable 20 can provide is not present in the storage 130, that is, if the combined information is not present in the storage 130, the processor 140 may provide recommendation information on a content only based on the combined viewing history of a user, to the display.

The processor 140 may generate combined information on a content based on at least one of information included in a signal provided from the plurality of input sources, information provided from an external server and information included in an image provided through the display, and store the combined information in the storage 130.

The content information collection method of the processor 140 may vary according to an input source. The processor 140 may, in response to sensing connection of an input source, classify the type (or the property) of the input source. The type of an input source may be classified as the set-top box 10, the cable 20, the USB 30, streaming or the like.

If metadata including information on a content which an input source can provide is included in a signal provided from an input source, the metadata may be collected according to a communication method by which the input source is connected. For example, if the display device 100 is connected with the set-top box 10 or a computer (not illustrated) through the HDMI input terminal 121, the metadata may be collected through CEC information according to HDMI standard.

If it is not possible to collect metadata as the processor 140 is connected to an input source by the communication method by which the processor 140 cannot transmit metadata to, and receive metadata from, the input source, the processor 140 may generate combined information based on at least one of information provided from an external server and information included in an image provided through the display 110, and store the combined information in the storage 130. For example, the processor 140 may perform an automatic content recognition (ACR) for the content that a user is viewing and collect content information based on the ACR result. In this case, the processor 140 may also collect information on the content that the user is currently viewing through digital finger printing information of the content currently viewed. Further, the processor 140 may perform an optical character reader/recognition (OCR) for a content display screen and collect content information based on the OCR result. Besides the above, the processor 140 may perform a web crawler for a content display screen and a web page related to an input source, and collect information on a content. Also, if the processor 140 receives a content through a streaming service, the processor 140 may directly access the streaming URL and collect the corresponding content information. However, the content information collection method is not limited to the aforementioned examples.

Meanwhile, the processor 140 may collect information on various contents simultaneously or at different time points. The processor 140 may, if the processor 140 fails to collect at least some of content information after collecting a content according to one of the methods (metadata, ACR, OCR, a web crawler, etc.), the processor 140 may additionally collect content information using any other method. For example, the processor 140 may collect information on a content based on metadata included in a signal provided from a plurality of input sources, and if there is information omitted or not collected according to a predetermined reference (for example, if the category for generating combined information is predetermined) the processor 140 may collect additional information using information provided from an external server or information included in an image provided through the display. However, this is one example, and a certain method is not limited.

The processor 140 may collect a plurality of pieces of information on the same content by the method for collecting a plurality of information. For example, the processor may collect a plurality of pieces of information on the same category of the same content, and in this case, the processor 140 may select one of the plurality of information collected according to a predetermined priority, and use the selected information to generate combined information.

The various example embodiments of the method for generating combined information may also be used in generating a combined viewing history of a user. For example, the processor 140 may generate a combined viewing history of a user through at least one of information included in a signal provided from an input source, information provided from an external server and information included in an image provided through the display. The processor 140 may generate a combined viewing history using metadata, ACR, OCR, a web crawler, etc., but is not limited thereto. Meanwhile, if a user has logged in, the combined viewing history may also be generated for each user based on identification information of a user who logged in.

If a predetermined event occurs, the processor 140 may update the combined information (e.g., 300 in FIG. 3) stored in the storage 130 and the combined viewing history of a user (e.g., 400 in FIGS. 4 and 600 in FIG. 6). The predetermined event may include at least one of an event where a received external input signal is changed, an event where a content provided through the display is changed and an event where a predetermined time arrives.

The processor 140 may classify content recommendation information according to at least one of a viewing time of content, a viewing frequency of content, a viewing lasting time of content and a genre of content based on the combined viewing history, and provide the information.

For example, the processor 140 may provide a recently viewed content, a content viewed the longest, a content viewed in the same time period as the current viewing time period, a content selected the most during a predetermined time, a genre of content viewed the most and the like based on the combined information and the combined viewing history.

In this case, the processor 140 may provide only a content that has been viewed recently as recommendation information, but may also provide a content viewed within a predetermined time (e.g., five hours) from the current time. Further, the processor 140 may also simultaneously provide a predetermined number (e.g., five contents) of contents with reference to the content that was the most recently viewed.

The processor 140 may, if the processor 140 provides a content viewed the longest, the processor 140 may provide a content viewed for the longest time consecutively and a content viewed the longest non-consecutively within a predetermined time (e.g., 24 hours) or the like.

FIG. 2B is a block diagram illustrating an example configuration of the display device 100 illustrated in FIG. 2A.

According to FIG. 2B, the display device 100 may include the display 110, the communication interface (e.g., including communication circuitry) 120, the storage 130 and the processor (e.g., including processing circuitry) 140. The description of the elements illustrated in FIG. 2B which are overlapped with the elements illustrated in FIG. 2A will be omitted.

The communication interface 120 may include circuitry to receive an external input signal from a plurality of input sources. The communication interface 120 may connect the display device 100 with an external device by control of the processor 140. The communication interface 120 may download a content from an external source by control of the processor 140 or receive a content by streaming. The communication interface 120 may be connected with a plurality of input sources via cable or wirelessly. The communication interface 120 may be provided with a content from a plurality of input sources through HDMI (121), a cable (122), an antenna (123), RGB (124), Wi-Fi (125), USB (126), a component (127), a wired Ethernet (128), Bluetooth (129) or the like, but such elements are examples, and not limited thereto. The communication interface 120 may receive contents of various formats.

The storage 130 may store a control program for controlling the display device 100 and the processor 140, an application firstly provided from a manufacturing company or downloaded from an external source, a GUI related to an application, a content provided from an input source, information on a content, a viewing history of a user and the like. The storage 130 may also change the format of information on a content and a viewing history of a user by control of the processor 140 and store the information. The processor 140 may provide content recommendation information using information on a content stored in the storage 130, a viewing history of a user and software, to the display 110.

The storage 130 may include a memory card (e.g., a micro SD card, a USB memory, etc.) equipped in the display device 100, an external memory (e.g., a USB memory, etc.) that can be connected to the port of the USB 154 of an input/output unit 150, a non-volatile memory, a volatile memory, a hard disk drive (HDD) or a solid state drive (SSD).

The processor 140 may include, for example, and without limitation, a CPU 141, a ROM (or a non-volatile memory 143) in which a control program for controlling the display device 100 is stored and a RAM (or volatile memory 142) used to store data input from outside of the display device 100 or used as a storage area corresponding to various operations performed in the display device 100.

However, in some cases, it is also possible to equip with a first processor configured to control the display device 100 and the second processor configured to provide content recommendation information based on a combined viewing history of a user and combined information which are stored in the storage 130. In this case, the second processor may, if the second processor receives a control signal requesting content recommendation information from the first processor, provide content recommendation information to the display 100 based on the combined viewing history and the combined information which are stored in the storage 130 according to the received control signal.

The CPU 141 may access the storage 130, and boot the display device 100 using an O/S stored in the storage 130, and may perform various operations using various programs, contents, data, etc. which are stored in the storage 130.

In ROM 143, a command word set for booking a system may be stored. If a turn-on command is input and power is supplied, the CPU 141 may copy an O/S stored in the storage 130 to the RAM 142 according to a command word stored in the ROM 143, execute the O/S and boot the system. Once the booting is completed, the CPU 141 may copy various programs stored in the storage 130 to the RAM 142, execute the program copied to the RAM 142 and perform various operations. The CPU 141, the ROM 143 and the RAM 142 may be connected to one another through an internal bus.

FIG. 3 is a diagram illustrating an example of combined information in which information on contents available from a plurality of input sources are combined according to an example embodiment.

Referring to FIG. 3, when the combined information 300 is stored, information on a content is classified according to a plurality of categories. For example, the combined information 300 may be classified according to the categories such as a channel number 310, a broadcasting station unique number 320, a name of broadcasting station 330, a title or name of program 340, a genre 350, an input source 360 and a service provider 370. However, the above categories are examples, and every element that can be used to classify contents available from a plurality of input sources may be generated as a category. For example, although it is not illustrated in FIG. 3, a unique ID of a program, program information, a broadcasting time, a content information collection method, etc. may be generated as categories and be stored in the storage 130 as the combined information 300.

The processor 140 may collect and generate the combined information 300 based on at least one of information included in a signal provided from a plurality of input sources, information provided from an external server (not illustrated) and information included in an image provided through the display 110, but is not limited thereto. The combined information 300 may also be collected and generated by going through a web crawler or a parsing process in a web page including a channel number of broadcasting station, a name of broadcasting station, a name of program or the like. For example, the processor 140 may access a web page through Wi-Fi, wired Ethernet, etc. of the communication interface 120, perform a web crawler process, collect information on a content that can be provided by at least one of input sources connected with the display device 100, and generate the combined information 300 based on the collected information.

The processor 140 may, if information on some of categories of a certain input source has not been collected, supplement the omitted information based on pre-stored combined information or information collected through another input source. For example, in FIG. 3, when collecting information on a content that the set-top box 10 can provide, if the information of a genre 350 of "Morning Ground" on "KBS1" is omitted, the processor 140 may supplement information of the genre 350 based on information on a cable input source, that is, may supplement information of "culture/information." When generating the combined information 300, not all the information is requested to be supplemented through the processor 140, but information on a certain category or a certain channel may not be collected.

FIG. 4 is a diagram illustrating an example of a combined viewing history 400 of a user according to an example embodiment.

The processor 140 may combine a viewing history with respect to each of a plurality of input sources and generate a combined viewing history, and provide content recommendation information based on the generated combined viewing history 400. The combined viewing history 400 may be generated by combining information on a content that a user viewed among the contents provided by a plurality of input sources. For example, the history of viewing contents viewed through a plurality of input sources such as the set-top box 10, the cable 20, the USB 30, etc. may be generated as the combined viewing history 400. The combined viewing history (400) may include a plurality of categories. For example, the combined viewing history 400 of a user may be classified according to the categories such as a channel number 410, a broadcasting station unique number 420, a name of broadcasting station 430, a title or name of program 440, a genre 450, an input source 460, a viewing start time 470, a viewing end time 480 and the like, but is not limited thereto as these categories are examples. The combined viewing history 400 may, for example, additionally include the categories such as a system time of the display device 100, a program unique ID and the like.

The processor 140 may not newly generate and add a new viewing history to the combined viewing history 400, but may update a pre-stored viewing history if the categories of a new viewing history and of a pre-stored viewing history are the same, being more than a predetermined number, if a certain category is the same or if the viewing end time 480 of a pre-stored viewing history and the viewing start time 470 of a new viewing history are within a predetermined time. For example, while a user watches, through the set-top box 10, a content whose name of broadcasting station is "KBS2," if the user watches a content whose name of broadcasting station is "MBC" for ten seconds and watches the content of broadcasting station "KBS2" again, the processor 140 may not generate two viewing histories of the content whose name of broadcasting station "KBS2" but may newly update only the viewing end time 480 in the pre-stored viewing history whose name of broadcasting station "KBS2" and store the updated viewing end time in the combined viewing history 400.

As another example embodiment, while the user watches through the set-top box 10 a content called "Descendants of Sun, the third episode" whose name of broadcasting station is "KBS2" and whose genre is TV drama, if the user watches through the cable 20 a program called "Descendants of Sun, the third episode" whose name of broadcasting station is "KBS2" and whose genre is TV drama, the processor 140 may not generate two viewing histories in the combined viewing history, but may newly update only the viewing end time 480 of the pre-stored viewing history which was generated while watching the program through the set-top box 10, and store the updated viewing end time in the combined viewing history 400.

Further, when generating the combined viewing history 400, the processor 140 may supplement some of the information that has not been collected based on the pre-stored combined information 300 or the pre-stored combined viewing history 400. For example, it may be assumed that a user watches the content whose title is "Morning Wide" and whose name of broadcasting station is "SBS." If the processor 140 collected the information of the title of the program "Morning Wide" but has not collected the information of the name of broadcasting station "SBS," the processor 140 may additionally collect the information of the name of broadcasting station "SBS" based on the pre-stored combined information 300 or the pre-stored combined viewing history 400.

Further, if it is determined that a user viewed a content for less than a predetermined time based on the viewing start time 470 and the viewing end time 480 of the content, the processor 140 may not add the viewing start time and the viewing end time to the combined viewing history 400. For example, it may be assumed that a user changes a channel within channel numbers 5 to 10 through a remote control device (not illustrated). If the viewing start time 470 and the viewing end time 480 of each channel number are less than ten seconds, the processor 140 may determine that the user has not watched the corresponding content, and may not add the viewing start time and the viewing end time to the combined viewing history 400.

The processor 140 may display an appropriate content recommendation information based on the combined viewing history 400 illustrated in FIG. 4.

FIGS. 5A, 5B, 5C, 5D, 5E and 5F are diagrams illustrating an example method for providing content recommendation information according to an example embodiment.

Figure 5A:
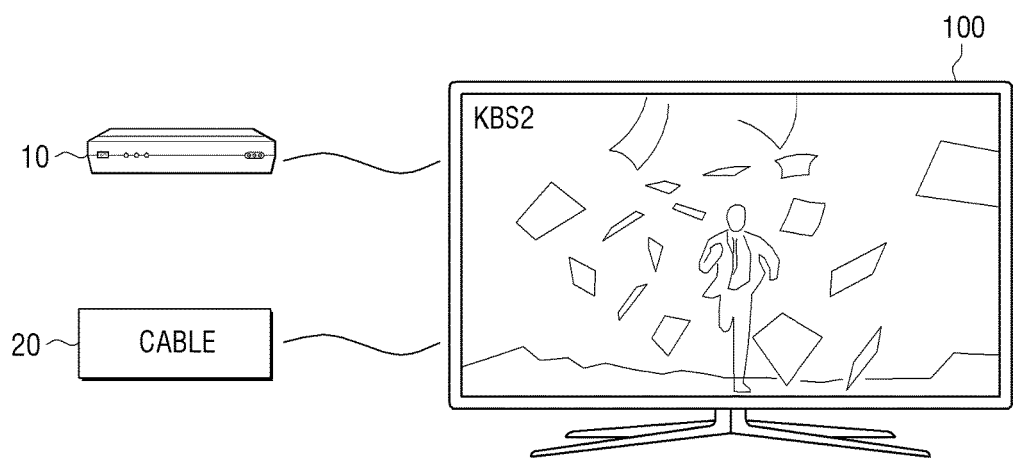
FIGS. 5A, 5B, 5C, 5D, 5E and 5F are diagrams illustrating examples of providing content recommendation information according to an example embodiment.

FIG. 5A illustrates that a user views a content using a plurality of input sources, that is, using the set-top box 10 and the cable 20. The user may select a certain input source among the plurality of input sources and view an image.

If the set-top 10 box is selected by a user and an external input signal is received from the set-top 10, the display 110 may display a content provided by the set-top 10. In this case, the processor 140 may generate a viewing history of a content that a user is currently viewing and store the viewing history in the storage 130. The content viewing history stored in the storage 130 may have a form of the combined viewing history 400.

Figure 5B:
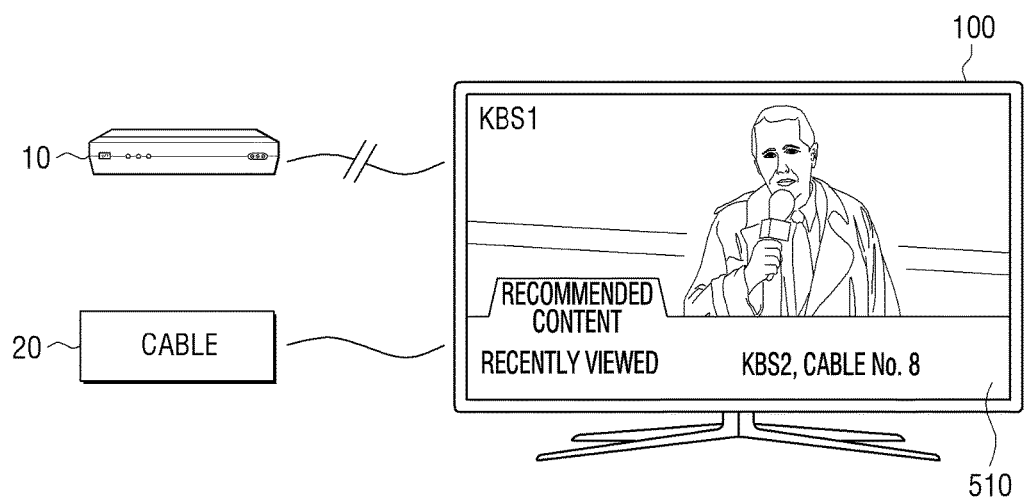

FIG. 5B is an example embodiment of providing content recommendation information if an input source is changed and an external input signal is provided according to the changed external input source.

The processor 140 may, if an event where it is not possible to receive an external input signal from a first input source, provide content recommendation information that can be provided through a second input source among a plurality of input sources. For example, while the display device 100 receives an external input signal through the first input source among a plurality of input sources, if a faulty in connection state, disconnection, etc. occur in the first input source, the processor 140 may provide recommended content information among the contents that the second input source connected with the display device 100 can provide based on a viewing history of a user and the combined information 300. For instance, as illustrated in FIG. 5B, if the display device 100 is connected with the set-top box 10 and the cable 20, but it is not possible to receive a signal from "KBS2" from the set-top box 10 due to a faulty in connection state while the signal is received through the set-top box 10, the processor 140 may provide content information of the set-top box 10 which has been the most recently viewed, that is, channel information called "KBS2," and the channel number of "KBS2" that is content information of the cable 20 which corresponds to the above channel information based on the combined information 300 and a viewing history of a user 510.

Figure 5C:
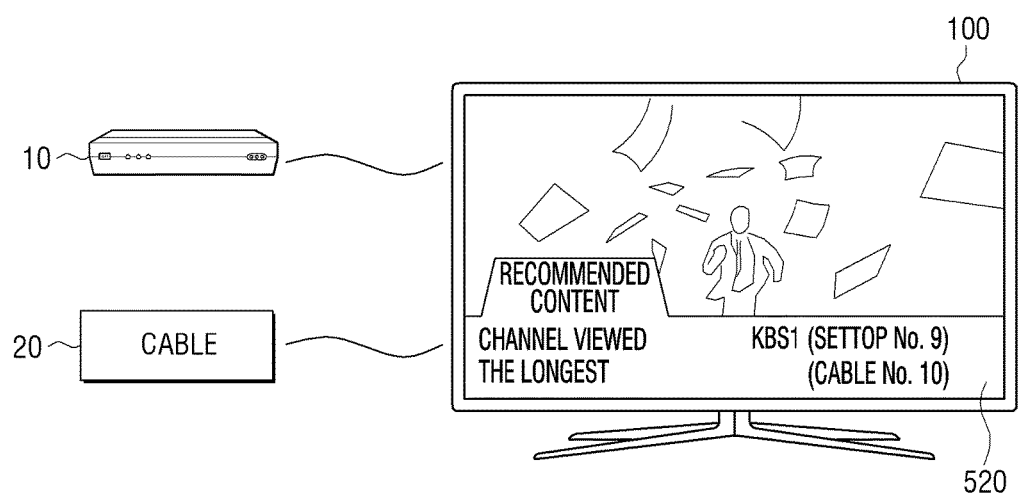

FIG. 5C illustrates an example of providing a channel viewed the longest as content recommendation information based on the combined information 300 and the combined viewing history 400 according to an example embodiment.

The processor 140 may determine a channel viewed the longest of a user based on the combined viewing history 400, and provide a channel number corresponding to the channel viewed the longest as content recommendation information. In this case, the processor 140 may provide information of the channel viewed the longest which corresponds to at least one input source currently connected.

Figure 5D:
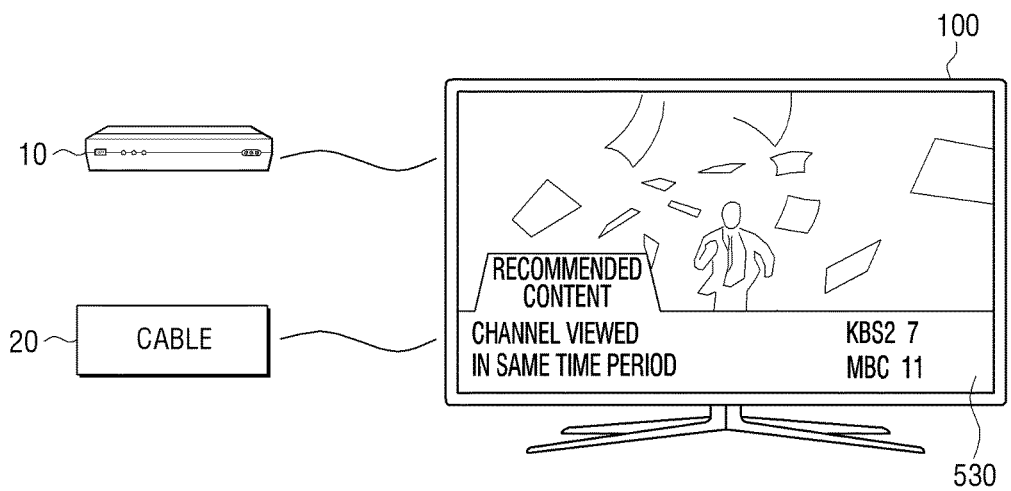

For example, if "KBS1" is determined as the name of the broadcasting station which is viewed the longest based on the combined viewing history 400 and the display device is currently connected to the set-top box 10 and the cable 20, the processor 140 may determine that the channel number of the set-top box 10 which correspond to "KBS1" is '9' and that the channel number of the cable 20 which correspond to "KBS1" is '10' based on the combined information 300. The processor 140 may recommend a channel number 520 corresponding to "KBS1" which is the channel viewed the longest as a content viewed the longest for each connected input source based on the determination result. FIG. 5D illustrates an example of providing a viewing channel of the same time period as content recommendation information 530 based on the combined information 300 and the combined viewing history 400.

The processor 140 may review a viewing channel of the same time period as the current time period regardless of the input source 460 based on the combined viewing history 400. The processor 140 may review a viewing start time 470 and a viewing end time 480 in the combined viewing history 400 of a user and provide the channel that was viewed in the time period corresponding to the current system time of the display device 100, as content recommendation information. In this case, the processor 140 may provide information on the channel of the same time period corresponding to at least one of input sources currently connected.

For example, if there is a record that a user viewed contents whose name of the broadcasting stations are "KBS2" and "MBC" at 23:00 through the set-top box (10) in the combined viewing history 400, the processor 140 may provide "KBS2" and "MBC" as content recommendation information at 23:00 even if an input source is changed to the cable 20. Further, the processor 140 may also recommend a channel number 530 corresponding to the name of the broadcasting station based on the combined information 300 along with the content recommendation information.

Figure 5E:
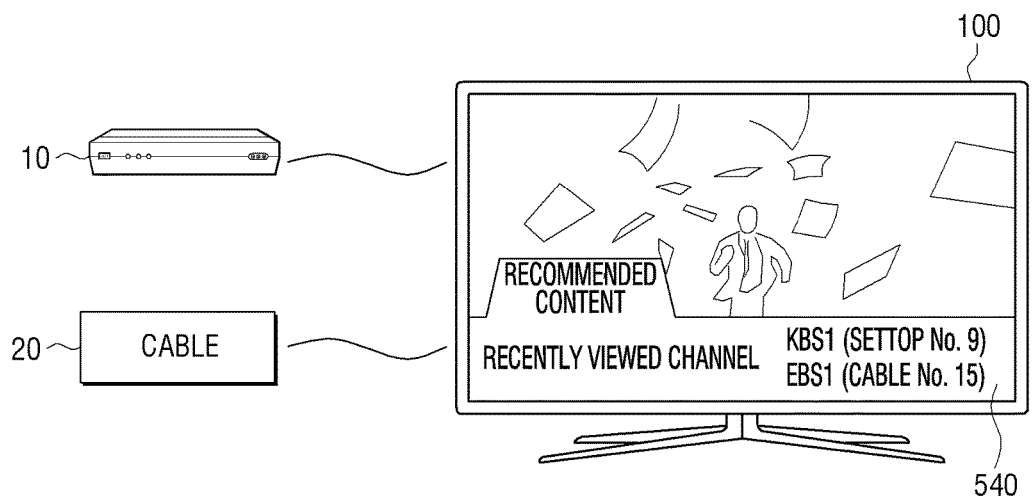

FIG. 5E illustrates an example of providing a recently viewed channel as content recommendation information based on the combined information 300 and the combined viewing history 400 according to an example embodiment.

If the display device 100 receives an external input signal through a second input source while receiving an external input signal through a first input source, the processor 140 may provide content recommendation information based on the viewing history of a user and the combined information 300 by providing content recommendation information that can be provided by the second input source based on the viewing history of content viewed in the first input source.

As an example, the processor 140 may provide to a user a recently viewed channel as content recommendation information (e.g., a content title, a channel number providing the content) in the second input source based on the viewing history of a user viewing through the first input source. For example, as illustrated in FIG. 5E, if a user changes an input source to the cable 20 while watching the content whose name of the broadcasting station is "EBS" through the set-top box (10), the processor 140 provide "EBS" that was watched through the set-top box 10 as content recommendation information in the cable 20. In this case, the processor 140 may also provide a channel number of the cable 20 which corresponds to "EBS" as recommendation information 540 based on the combined information 300. The recently viewed channel recommendation information 540 may include recommendation information on not only the channel viewed immediately before the current channel but also the channel viewed within a predetermined time period. For example, if a user watched a content provided by the broadcasting station "KBS1" within 30 minutes and watched a content provided by the broadcasting station "EBS" within 50 minutes, and if a predetermined time is one hour, the recently viewed channel recommendation information 540 may provide both "KBS1" and "EBS." Further, the processor 140 may also recommend at least one of a channel number corresponding to an input source and input source information based on the combined viewing information 300 along with the recently viewed channel recommendation information.

Figure 5F:
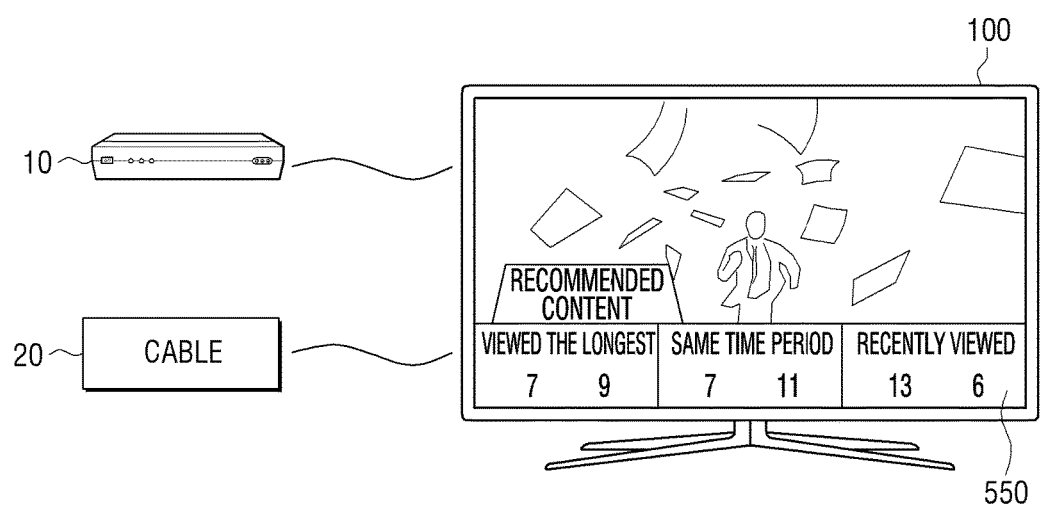

FIG. 5F illustrates an example of simultaneously providing content recommendation information as illustrated in FIGS. 5B to 5E according to an example embodiment.

The content recommendation information illustrated in FIGS. 5B to 5E is an example embodiment, and various content recommendation information may be provided by a user input through a remote control device (not illustrated), etc. or control of the processor 140. In this case, the processor 140 may classify content recommendation information 550 according to at least one of a viewing frequency of content, a viewing lasting time of content and a genre of content based on the combined viewing history and provide content recommendation information.

FIG. 6 is a diagram illustrating another example of combined viewing history of a user according to an example embodiment.

FIG. 6 illustrates a combined viewing history 600 in which all contents that a user viewed are combined and stored. The combined viewing history 600 may include the categories such as a channel number 610, a broadcasting station unique number 620, a name of broadcasting station 630, a name or title of program 640, a genre 650, an input source 660, a viewing start time 670, a viewing end time 680 and the like, but is not limited thereto.

The combined viewing history 600 illustrated in FIG. 6 may be one combined viewing history 600 which is generated by combining contents that a user watches through a plurality of input sources, not by generating a separate viewing history according to an input source. As shown in the combined viewing history 600 illustrated in FIG. 6, all viewing histories of a user may be created in one combined viewing history 600. In this case, the processor 140 may derive content recommendation information based on various conditions such as the number of same predetermined categories of the histories stored in the combined viewing history of a user, a similarity between the names of programs, a similarity between genres, whether certain categories are the same, or the like. Further, the processor 140 may provide recommendation information using algorithms such as each time period, a genre, a recently viewed channel, a channel viewed the longest based on the combined viewing history 400 and 600. The above example is, however, one example of deriving content recommendation information based on the combined viewing history 600, and not limited thereto.

For example, if a user watched "Descendants of Sun, the sixth episode" through the set-top box 10, "Descendants of Sun, the seventh episode" through the cable 20 and "Descendants of Sun, the eighth episode" through the USB 30, the processor 140 may provide "Descendants of Sun, the ninth episode" as content recommendation information to the user.

Figure 7A:
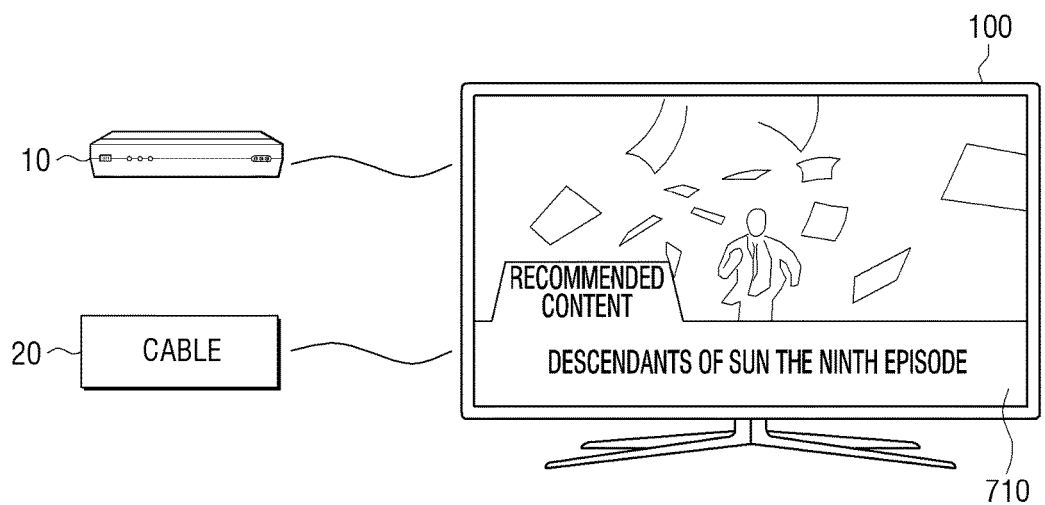
FIGS. 7A and 7B are diagrams illustrating examples of providing content recommendation information according to an example embodiment.
Figure 7B:
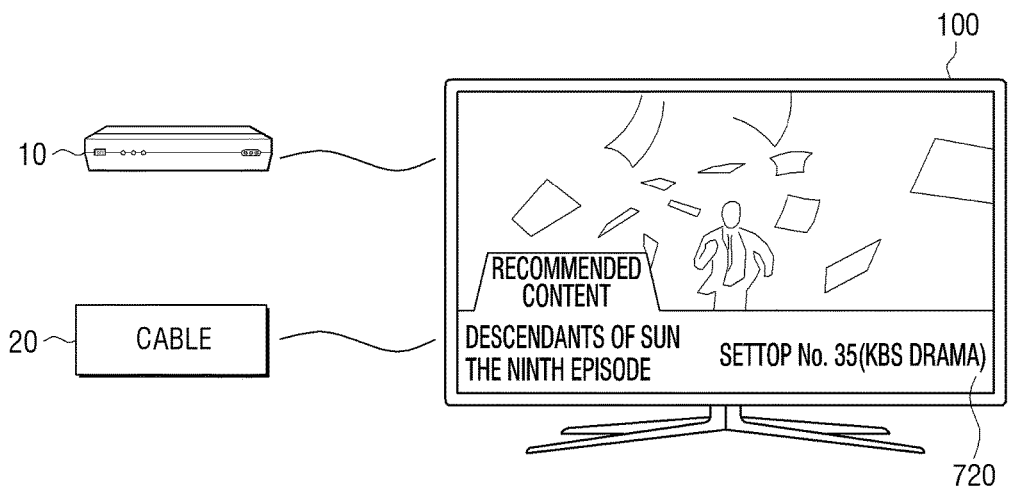

FIGS. 7A and 7B are diagrams illustrating an example of providing content recommendation information according to an example embodiment.

FIG. 7A illustrates an example where the processor 140 provides "Descendants of Sun, the ninth episode" as recommendation information 710 based on the combined viewing history 600. As described above, the processor 140 may recommend a content based on the combined viewing history 600 which is generated regardless of an input source.

Further, as illustrated in FIG. 7B, the processor 140 may provide recommendation information 720 based on an external input signal currently input based on the combined information 300. In addition to recommending the name of program, the processor 140 may also review the combined information 300 and provide the current channel number on which a recommended content is currently broadcasted or the name of broadcasting station, as recommendation information 720. For example, when a user receives an external input signal from the set-top box 10 and is provided with a content, the processor 140 may not only recommend "Descendants of Sun, the ninth episode," but also provide the information that the content is currently broadcasted on "the channel number 35-KBS Drama" of the set-top box 10 which currently receives an external input signal, as recommendation information. The above example, however, is one example, and not limited thereto. If another currently connected input source which is not a current input source receiving an external input source at current but the input source can provide a corresponding content, the content may also be provided as recommendation information. For example, if the processor 140 determines that there is "Descendants of Sun, the ninth episode" in the USB 30 based on the combined information 300, the processor 140 may provide "Descendants of Sun, the ninth episode" stored in the USB 30 as content recommendation information even if a user receives an external input signal through the cable 20. Of course, if both the input source currently receiving an external input signal and another input source simply being connected can provide the corresponding content, it may also be possible to provide the corresponding information.

Figure 8:
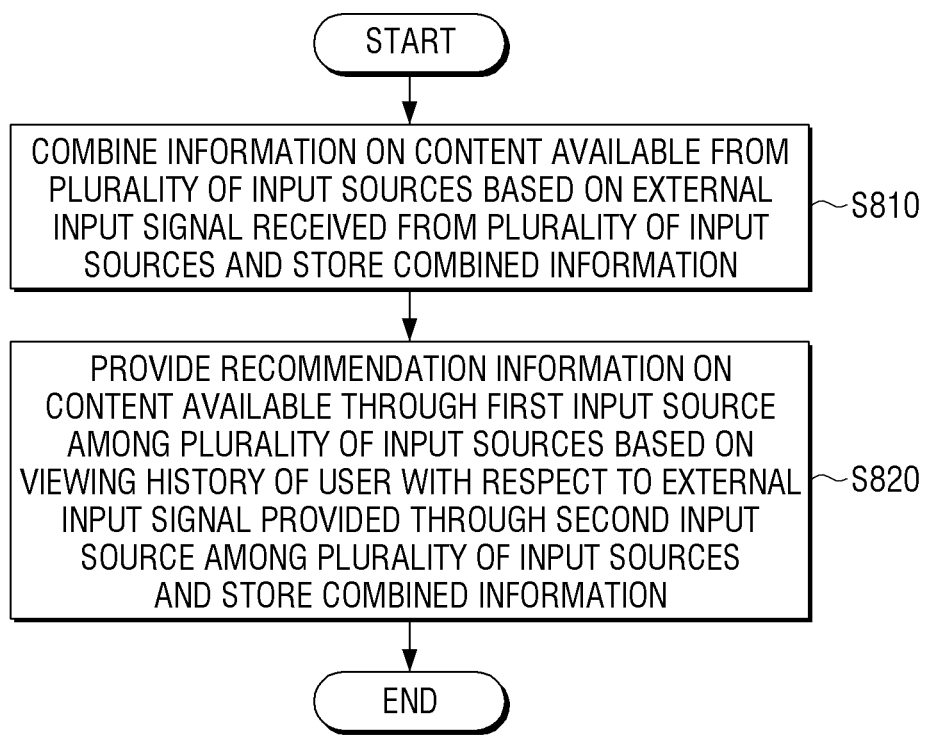
FIG. 8 is a flowchart illustrating an example content recommendation method of a display device according to an example embodiment.

FIG. 8 is a flowchart illustrating an example content recommendation method of a display device according to an example embodiment.

According to the content recommendation method of a display device illustrated in FIG. 8, information on contents available from a plurality of input sources are combined based on external input signals received from the plurality of input sources and the combined information is stored (S810).

Then, recommendation information on a content available through a second input source among the plurality of input sources may be provided based on a viewing history of a user according to an external input signal provided through the first input source among the plurality of input sources and the stored combined information (S820).

In operation S820 providing recommendation information, the recommendation information may be provided based on an external input signal currently input through the second input source.

Further, in operation S820 providing recommendation information, if an event where it is not possible to receive an external input signal from the first input source occurs, content recommendation information available through the second input source among the plurality of input sources may be provided.

Also, operation S820 providing recommendation information may further include generating a combined viewing history in which viewing histories for each of the plurality of input sources are combined, and provide content recommendation information based on the combined viewing history.

With regard to providing recommendation information, recommendation information on a content corresponding to an external input signal currently input among the plurality of input sources may be provided based on the combined viewing history and the stored combined information.

Also in operation S820, content recommendation information may be classified according to at least one of a viewing frequency of content, a viewing lasting time of content and a genre of content based on the viewing history and provided.

In operation S810 combining information on a content and storing the combined information, the combined information may be generated based on at least one of information included in a signal provided from the plurality of input sources, information provided from an external server and information included in an image provided through the display, and stored.

Also in operation S810, the stored combined information may be updated if at least one of an event where the received external input signal is changed, an event where a content provided through the display is changed and an event where a predetermined time arrives occur.

Figure 9:
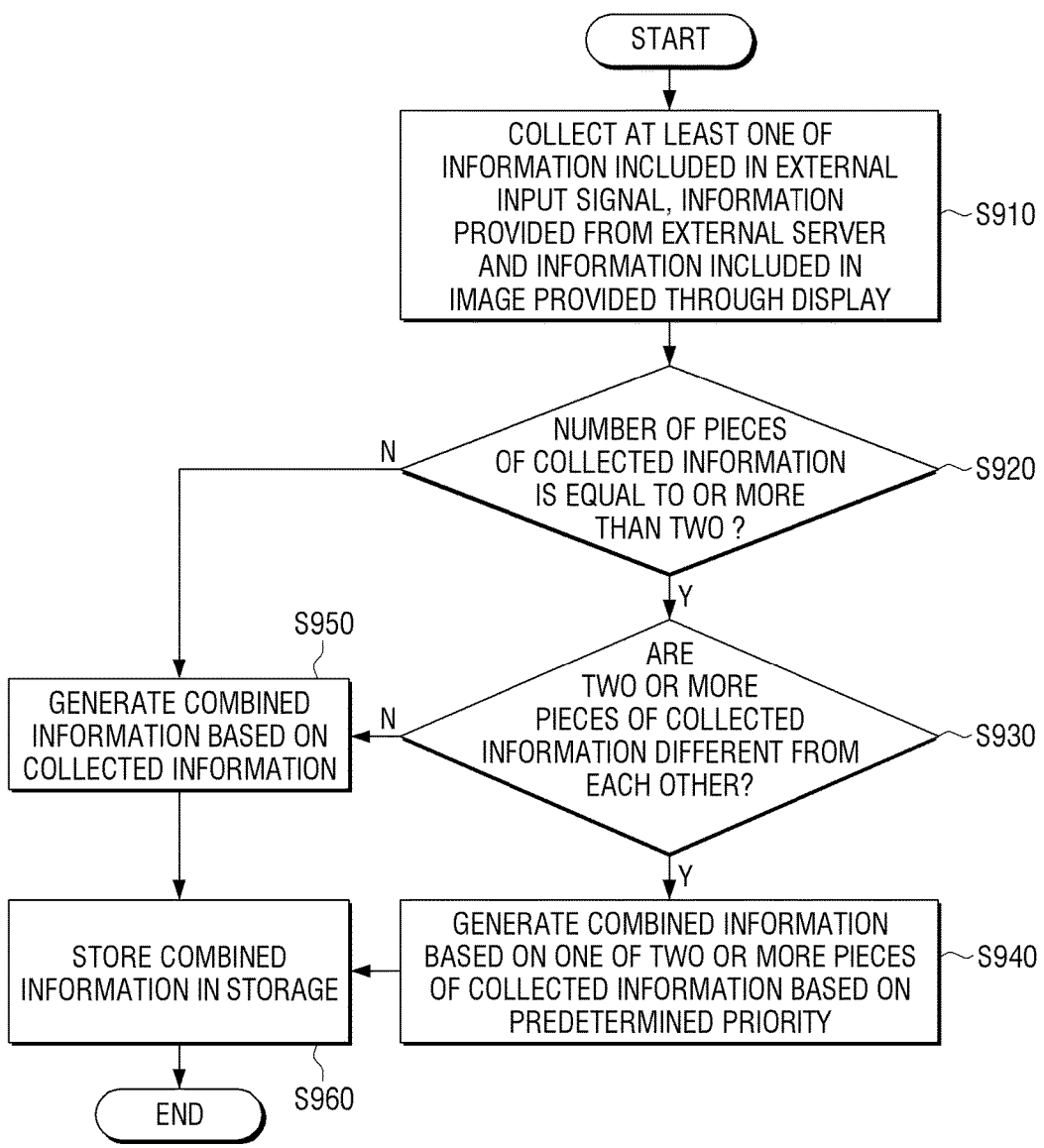
FIG. 9 is a flowchart illustrating an example generation method for generating combined information according to an example embodiment.

FIG. 9 is a flowchart illustrating an example combined information generation method according to an example embodiment.

As illustrated in FIG. 9, according to the combined information generation method according to an example embodiment, at least one of information included in an external input signal, information provided from an external server and information included in an image provided through the display may be collected (S910). Then, if the number of the pieces of collected content information is equal to or more than two (S920:Y), it is determined whether the two or more pieces of collected content information are different from each other (S930). If the two or more pieces of collected content information are different (S930:Y), combined information may be generated based on a priority predetermined between the content information collection methods (S940). Then, the combined information is stored in the storage 130 (S960). For example, it may be assumed that information on a content is collected through metadata, and information on a content is collected through ACR. If the content information collected through metadata and the content information collected through ACR are different from each other, the combined information may be generated based on the content information collected through metadata. That is because metadata is set to have a higher priority than OCR, but it is not mandatory to set the priority as above. As described above, the combined information may be generated by collecting information included in a signal provided from an input source according to a predetermined priority, information provided from an external server and information included in an image provided through a display. However, the processor 140 may also collect at least one of information included in a signal provided from an input source, information provided from an external server and information included in an image provided through a display, and generate the combined information based on the collected information without a predetermined priority.

Meanwhile, if the number of collected information on a content is not more than 2 (S920:N), the combined information may be generated based on the collected information (S950). Then, the combined information may be stored in the storage 130 (S960).

However, if the number of pieces of collected information is equal to or more than 2 and the two or more pieces of collected information are not different (S930:N), the combined information may be generated based on the collected information. Then, the combined information may be stored in the storage 130 (S960).

Meanwhile, the aforementioned method according to various example embodiments may be implemented by only upgrading software/hardware of the existing display device.

Further, the aforementioned example embodiments may also be implemented through an embedded server provided in a display device or an external server.

Also, a non-transitory computer readable medium in which a program performing the control method according to an example embodiment is stored may be provided.

A non-transitory computer readable medium is a medium which stores data, and may perform a reading through a device. For example, the programs for performing the various methods described above may be stored in and provided through a non-temporary reading device such as a CD, a DVD, a hard disk, Blu-Ray, a disk, an USB, a memory card, a ROM and the like.

The foregoing example embodiments and advantages are merely examples and are not to be construed as limiting the disclosure. The description of the example embodiments is intended to be illustrative, and not to limit the scope of the disclosure, as defined by the appended claims, and many alternatives, modifications, and variations will be apparent to those skilled in the art.

What is claimed is:
1. A display device comprising:
a display;
a content receiving interface comprising circuitry configured to receive contents from a plurality of input sources;
a storage; and
a processor configured to:
control the storage to store viewing history information including a first viewing history related to a first content received from a first input source of the plurality of input sources;
in response to a second content, of a second input source of the plurality of input sources, being viewed, determine a relation between the first content and the second content by comparing a plurality of category information pieces of the second content with a plurality of category information pieces of the first content,
update the first viewing history by using the plurality of category information pieces of the second content or add, to the viewing history information, a second viewing history related to the second content by using the plurality of category information pieces of the second content, based on the determined relation between the first content and the second content, and
display, on the display, recommendation information on a content available through at least one of the first input source and the second input source based on the viewing history information stored in the storage,
wherein when the processor updates the first viewing history, the processor is further configured to supplement the first viewing history using at least one of the plurality of category information pieces of the second content which is not included in the plurality of category information pieces of the first content.

2. The display device of claim 1, wherein the processor is configured to provide the recommendation information based on an external input signal currently input through the first input source.

3. The display device of claim 1, wherein the processor is configured to provide content recommendation information available through the first input source from among the plurality of input sources, in response to occurrence of an event where it is not possible to receive the external input signal from the second input source.

4. The display device of claim 1, wherein the processor is configured to generate a combined viewing history wherein a viewing history with respect to each of the plurality of input sources is combined, and to provide the content recommendation information based on the combined viewing history.

5. The display device of claim 4, wherein the processor is configured to provide recommendation information on a content corresponding to an external input signal currently input from among the plurality of input sources based on the combined viewing history and the combined information stored in the storage.

6. The display device of claim 4, wherein the processor is configured to classify and to provide the content recommendation information based on at least one of: a viewing time of content, a viewing frequency of content, a viewing lasting time of content and a genre of content of the combined viewing history.

7. The display device of claim 1, wherein the processor is configured to generate combined information on contents available from a plurality of input sources based on at least one of: information included in a signal provided from the plurality of input sources, information provided from an external server and information included in an image provided through the display, and to store the combined information in the storage.

8. The display device of claim 1, wherein the processor is configured to update combined information on contents available from a plurality of input sources stored in the storage, in response to occurrence of at least one of: an event where the received external input signal is changed, an event where a content provided through the display is changed and an event occurring at a predetermined time.

9. A content recommendation method of a display device, the method comprising:
   receiving content signals from a plurality of input sources;
   controlling a storage to store viewing history information including a first viewing history related to a first content received from a first input source of the plurality of input sources;
   in response to a second content, of a second input source of the plurality of input sources, determining a relation between the first content and the second content by comparing a plurality of category information pieces of the second content with a plurality of category information pieces of the first content;
   (a) updating the first viewing history by using the plurality of category information pieces of the second content, and/or (b) adding, to the viewing history information, a second viewing history related to the second content by using the plurality of category information pieces of the second content, based on the determined relation between the first content and the second content; and
   display, on a display, recommendation information on a content available through at least one of the first input source and the second input source based on the viewing history information stored in the storage,
   wherein the updating comprises supplementing the first viewing history using at least one of the plurality of category information pieces of the second content which is not included in the plurality of category information pieces of the first content.

10. The method of claim 9, wherein providing recommendation information comprises providing the recommendation information based on an external input signal currently input through the first input source.

11. The method of claim 9, wherein providing recommendation information comprises providing content recommendation information available through the first input source from among the plurality of input sources, in response to occurrence of an event where it is not possible to receive the external input signal from the second input source.

12. The method of claim 9 further comprising:
   generating a combined viewing history wherein a viewing history with respect to each of the plurality of input sources is combined;
   wherein providing recommendation information comprises providing the content recommendation information based on the combined viewing history.

13. The method of claim 12, wherein the providing recommendation information comprises providing recommendation information on a content corresponding to an external input signal currently input from among the plurality of input sources based on the combined viewing history and stored combined information on contents available from the plurality of input sources.

14. The method of claim 12, wherein the providing recommendation information comprises classifying and providing the content recommendation information based on at least one of: a viewing time of content, a viewing frequency of content, a viewing lasting time of content and a genre of content of the combined viewing history.

15. The method of claim 9, further comprising generating combined information on contents available from the plurality of input sources based on at least one of: information included in a signal provided from the plurality of input sources, information provided from an external server and information included in an image provided through the display, and storing the combined information.

16. The method of claim 9 further comprising:
   updating stored combined information on contents available from the plurality of input sources in response to occurrence of at least one of: an event where the received external input signal is changed, an event where a content provided through the display is changed and an event occurring at a predetermined time.

17. The display device of claim 1, wherein the recommendation information comprises respective channels from the first input source and the second input source that both provide the same content.

18. The display of claim 1, wherein the processor is configured to:
   in response to the number of category information pieces in the second content which are consist with the category information pieces in the first content being equal to or greater than a threshold value, update the first viewing history by using the plurality of category information pieces of the second content;
   in response to the number of category information piece in the second content which are consist with the category information pieces in the first content being less than the threshold value, update the second viewing history by using the plurality of category information pieces of the second content.

* * * * *